H. LINDLEY.
MILLING CUTTER.
APPLICATION FILED DEC. 7, 1908.

953,630.

Patented Mar. 29, 1910.

Witnesses
A. F. Gilmore
Parris & Beerist

Inventor.
Herbert Lindley.
Per Mason Fenwick Lawrence
Attorneys.

UNITED STATES PATENT OFFICE.

HERBERT LINDLEY, OF ALTRINCHAM, ENGLAND.

MILLING-CUTTER.

953,630. Specification of Letters Patent. Patented Mar. 29, 1910.

Application filed December 7, 1908. Serial No. 466,395.

*To all whom it may concern:*

Be it known that I, HERBERT LINDLEY, a subject of Great Britain, residing at Altrincham, in the county of Chester, Kingdom of Great Britain, have invented new and useful Improvements in Milling-Cutters, of which the following is a specification.

My invention relates to improvements in that class of rotary milling cutters for shaping or cutting metal and other material wherein the cutting edges are formed on loose or separate cutters which are secured in a suitable body by wedges and which can thus be renewed when worn without the expense of providing a new body. In practice it has been found that this class of milling cutters is very expensive to make owing to the great many cutting blades, blade holes and wedges required in comparison to the cutting surface obtained and which holes also weaken the body of the cutter, so that hitherto to produce a long cutter, the cutter body had to be made in sections.

My invention has for its object to provide means whereby the said defects are overcome, that is to say, whereby with a less number of blades a greater cutting surface can be obtained without weakening the cutter body and such loose cutting blades are more conveniently and securely held in the body and the cutter can be produced at a great deal less cost than hitherto has been the case.

I attain these objects by the means illustrated in the accompanying drawings, in which—

Figure 1:
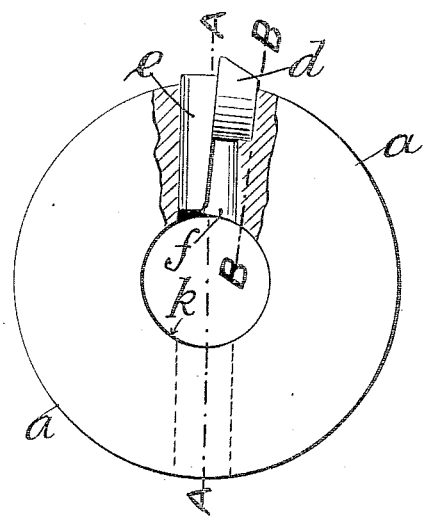
Figure 2:
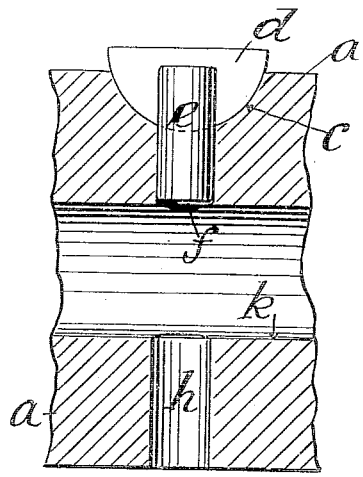
Figure 3:
Figure 5:
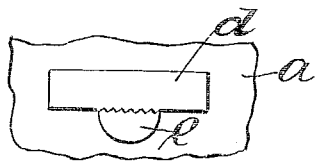
Figure 4:
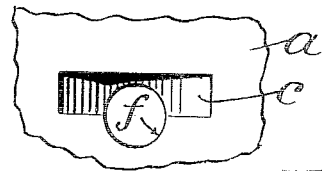
Figure 6:
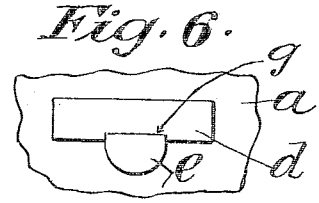
Figure 7:
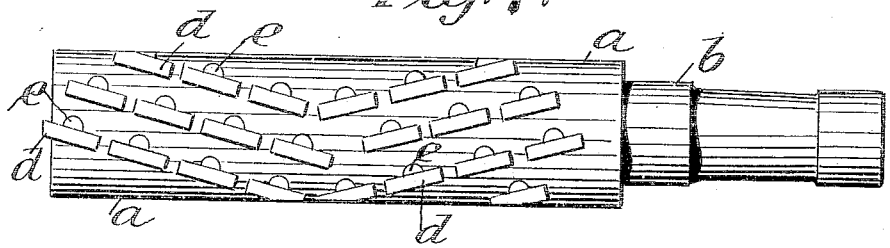

Figure 1 is an end view partly in section, Figs. 2 and 3 longitudinal sections of Fig. 1 on lines A—A and B—B respectively, Figs. 4, 5 and 6 plans detached, and Fig. 7 an elevation of a complete cutter constructed in accordance with my invention.

Similar letters refer to similar parts throughout the several views.

In carrying out my invention $a$ is the body of the cutter, which is usually of cylindrical form and has either a shank $b$ or is bored out and keyed to a separate mandrel whereby it receives motion from the spindle of the machine. This cutter body is made of any suitable material, preferably steel, and has formed therein a number of recesses $c$ of rectangular cross section and semi-circular or approximately semi-circular profile, see more particularly Figs. 3 and 4, which recesses can be conveniently and economically cut or milled out by means of a small circular saw or milling cutter of a suitable width which is sunk into the body of the cutter a convenient depth. The said recesses are disposed around the periphery of the cutter body in any convenient manner, the one I generally prefer to adopt is the following:—The recesses which have a length on the surface of the body much greater than their width, are arranged so that the longer sides lie approximately along a spiral around the body of the cutter, as shown in Fig. 7, several such spiral rows of recesses being formed according to the size of and milled radially or approximately radially in the body of the cutter. In each of these recesses is fitted a loose blade $d$ of steel of a quality suitable for cutting tools and having a semi-circular profile corresponding to the shape of the recesses in the body of the cutter and projecting a suitable distance beyond the surface of same so as to leave room for cuttings and allow for sharpening and wear.

In order to securely fix the cutting blades $d$ in the recesses $c$ I employ wedges $e$ consisting of short cylinders of steel each having a flat face milled or formed thereon at a small angle with the axis of the cutter body. Cylindrical holes $f$ into which the above wedges can slide are drilled in the body of the cutter, one for each recess and so placed in relation to the recesses that when the cylindrical wedges are placed in the recesses the flat faces on same will lie centrally and fair against the faces of the cutting blades, that is, the holes are drilled at an angle with the faces of the recesses and at such a distance therefrom that the flat faces on the wedges can be made to securely fix the blades in position when the wedges are driven home. The face of the cutter blade $d$ against which the wedge bears can be longitudinally serrated, as shown in Fig. 5, so as to indent the wedge $e$, or the wedge can be made to enter a groove $g$ in the face of the blade, as shown in Fig. 6, to insure that the blades shall not rotate in their grooves, but this is not usually necessary. The projecting portions of the said cutting blades are then ground as an ordinary spiral milling cutter.

In ordinary solid milling cutters the effect of spiral cutting edges when cutting, is to cause a considerable endwise thrust, especially in long cutters, the direction of such thrust depending on the hand of the spiral. In cutters constructed according to my invention however, it is possible to set the blades or cutting tools *d* tangentially to two spirals, as shown in Fig. 7, namely, one left handed for one half of the length of the cutter body and the other right handed for the other half, so that the endwise thrust due to one spiral is neutralized by the thrust due to the other.

In order to provide means for extracting the cutting blades when they require renewing, I may if an odd number of spirals are employed, drill holes *h* right through the body of the cutter as shown in Figs. 1 and 2, which meet the holes *f* in which slide the wedges *e*. A drift can then be employed for the purpose of driving the wedges out. In some cases however I form a hole *k* in the center of the cutter body, co-axial with same and of such a diameter that the wedge holes *f* can be conveniently drilled right through to meet the central hole *k* and a drifting arrangement operated in any convenient manner can be employed therein for driving out the wedges but such does not form part of my invention.

I claim:

1. In a milling cutter of the type hereinbefore referred to, recesses rectangular in plan and cross section and of semi-circular profile formed in rows in the periphery of the cutter body, cutting blades having a straight cutting edge and a semi-circular back edge fitting the said recesses, the said blades being supported by the said recesses in every direction and means for securing the said blades in the said recesses, all substantially as and for the purpose set forth.

2. In a milling cutter of the type hereinbefore referred to, recesses in the periphery of the cutter body rectangular in plan and cross section and of semi-circular profile cutting blades corresponding in cross section and profile with the said recesses and means for securing the said blades in the said recesses, comprising a cylindrical hole in the periphery of the cutter body at the side of each of the said blades and a cylindrical wedge in each of the said holes having a flat taper surface bearing against the exposed side of the cutter blade, all substantially as and for the purpose set forth.

3. In a milling cutter of the type hereinbefore referred to, recesses in the periphery of the cutter body rectangular in plan and cross section and of circular profile disposed to form two sets of spirals one left handed for the one half and the other right handed for the other half of the length of the cutter body and cutting blades corresponding in cross section and profile with and secured in the said recesses, all combined substantially as and for the purpose set forth.

In testimony whereof I have signed my name to this specification in the presence of two subscribing witnesses.

HERBERT LINDLEY.

Witnesses:
ALFRED BONHARDT,
STANLEY E. BRAMALL.